May 22, 1956

H. C. LAVENDER 2,746,311

POWER-STEERING DEVICE

Filed May 20, 1955

4 Sheets-Sheet 1

INVENTOR.
HILLERY C. LAVENDER,
BY

McMorrow, Berman & Davidson
ATTORNEYS.

May 22, 1956      H. C. LAVENDER      2,746,311

POWER-STEERING DEVICE

Filed May 20, 1955      4 Sheets-Sheet 3

INVENTOR.
HILLERY C. LAVENDER,
BY
McMorrow, Berman & Davidson
ATTORNEYS.

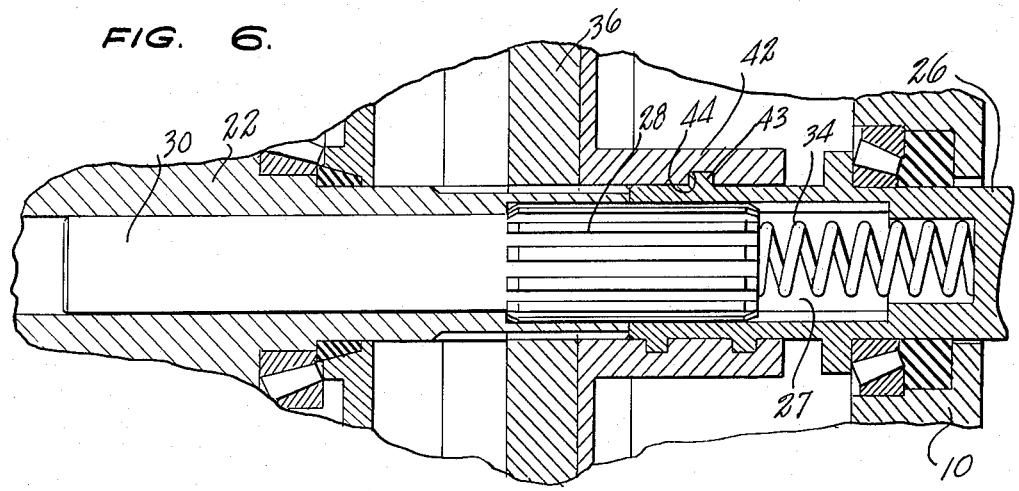
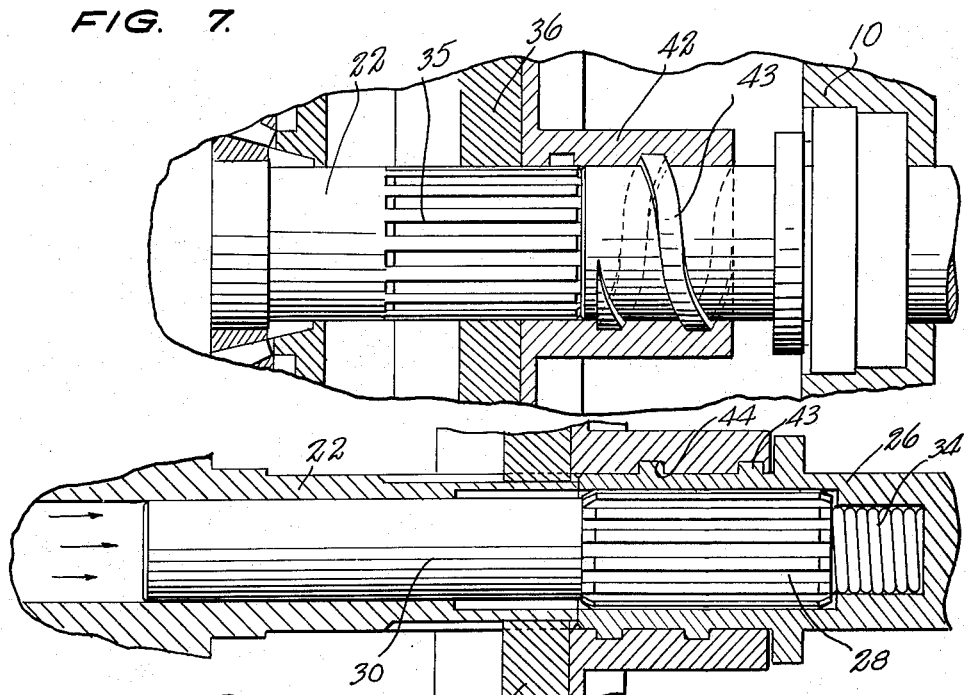

United States Patent Office 2,746,311
Patented May 22, 1956

2,746,311
POWER-STEERING DEVICE
Hillery C. Lavender, St. Louis, Mo.

Application May 20, 1955, Serial No. 509,910

3 Claims. (Cl. 74—388)

The present invention relates to a power-steering device for a vehicle.

The primary object of the present invention is to provide a fluid power servo-motor incorporated in a vehicle steering gear which is totally power driven but automatically shifts to manually driven if the fluid pressure fails.

Another object of the present invention is to provide a fluid power servo-motor incorporated in a vehicle steering gear which adds no resistance to manual operation when the fluid drive is inoperative.

A further object of the present invention is to provide a fluid power servo-motor incorporated in a vehicle steering gear and one of simple structure with a few parts having no valves which might fail to operate, and one which may be economically manufactured and assembled and incorporated in the steering gear apparatus of automobiles and other vehicles presently in use.

Figure 1:
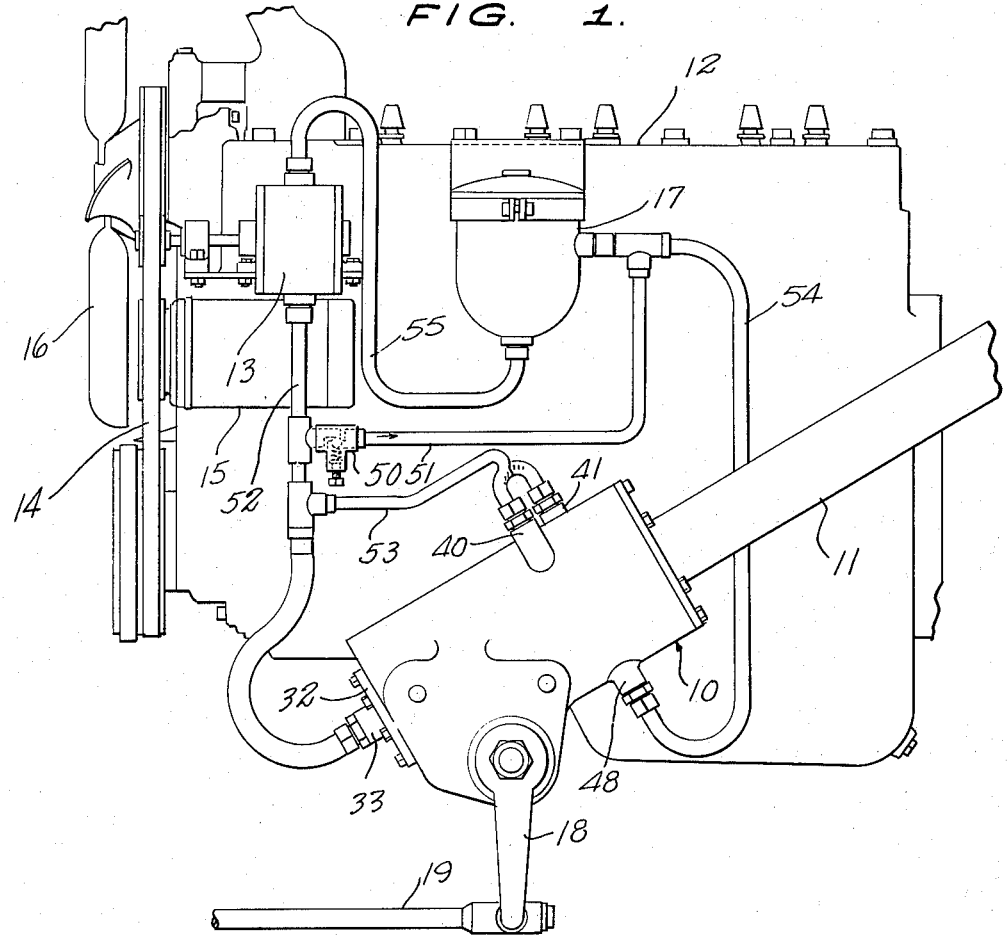
Figure 2:
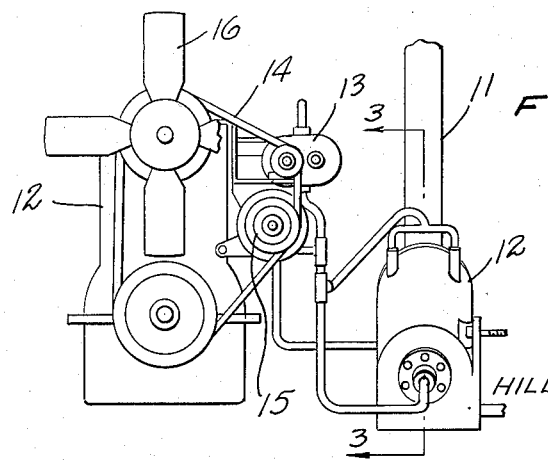
Figure 3:
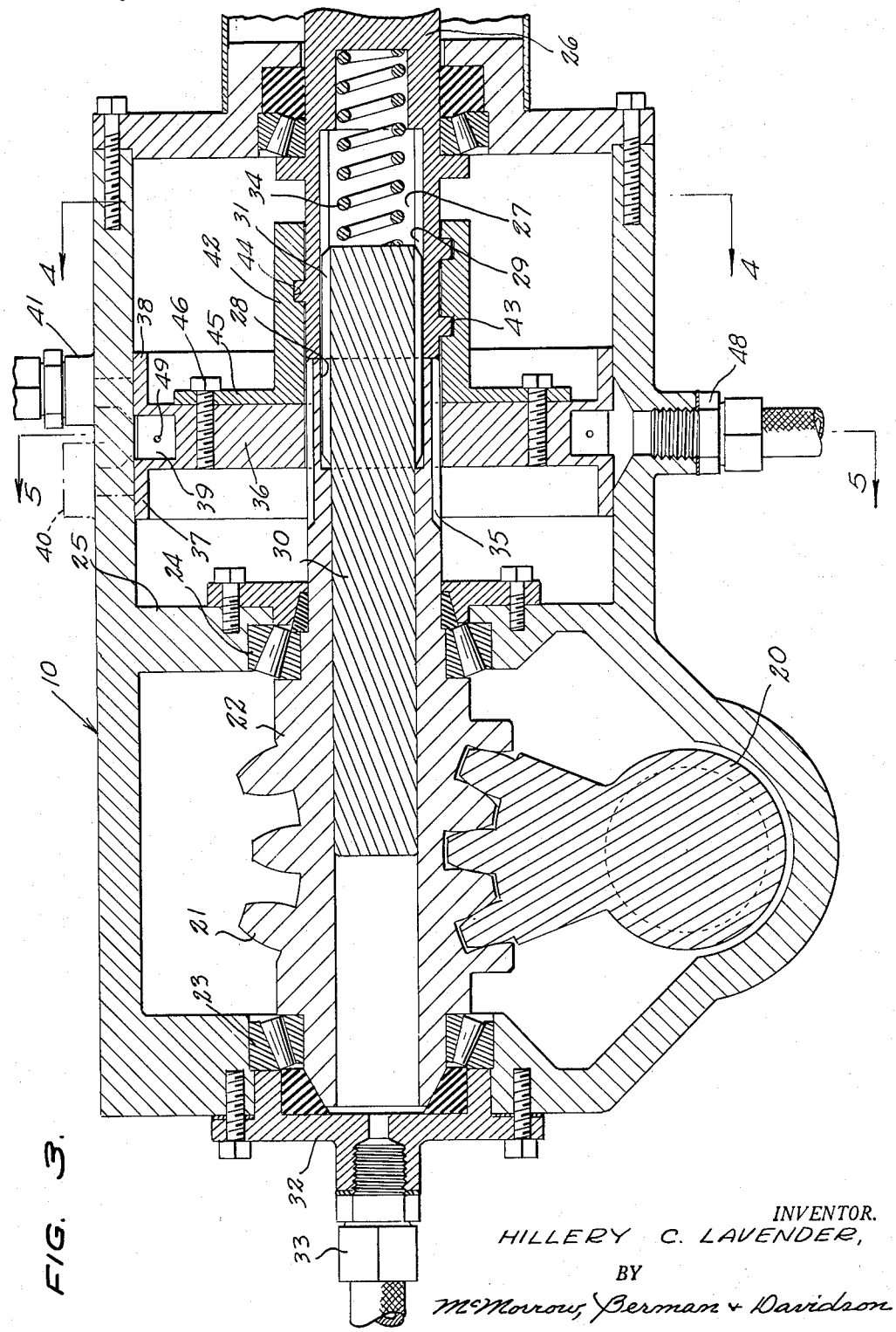
Figure 4:
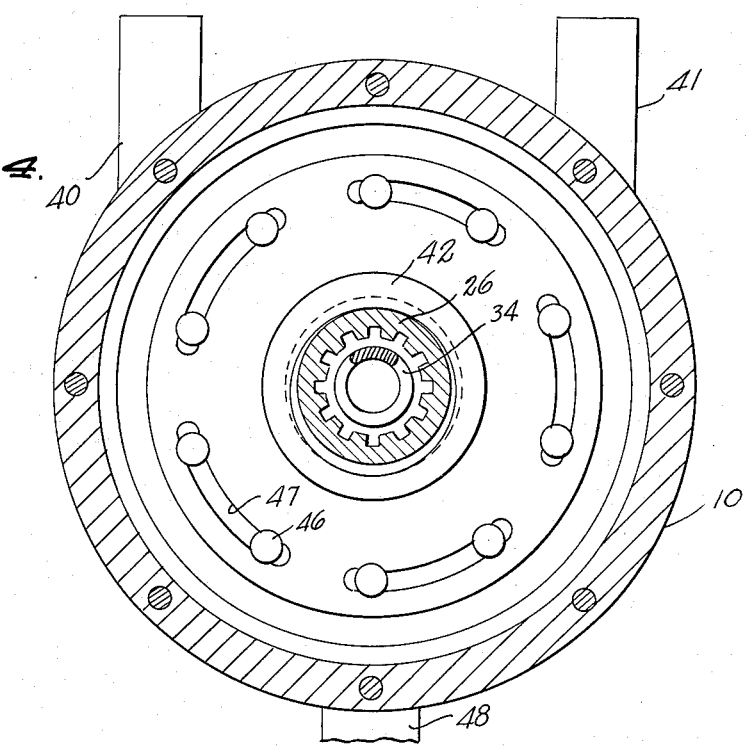
Figure 5:
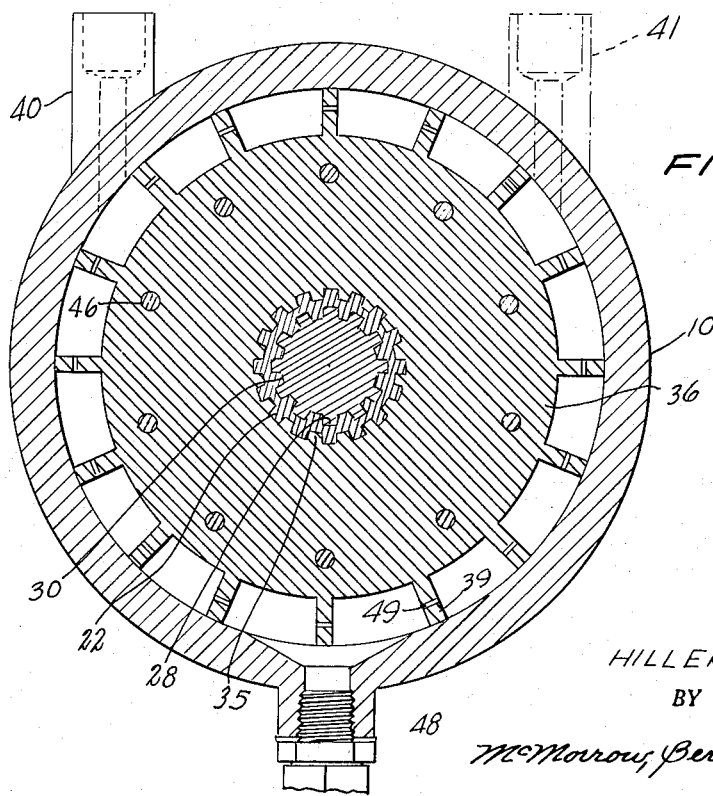

These and other objects and advantages of the present invention will be fully apparent from the following description when taken in connection with the annexed drawings, in which:

Figure 1 is a side elevational view of an automobile engine with the power steering device of the present invention installed thereon and connected to the steering link of the automobile, Figure 2 is a reduced forward view of the engine and the power-steering device of Figure 1, Figure 3 is a sectional view greatly enlarged on line 3—3 of Figure 2, Figure 4 is an end view in cross-section taken on line 4—4 of Figure 3, Figure 5 is a further end view in cross-section taken on line 5—5 of Figure 3, Figure 6 is a detail view partially in cross-section of a portion of Figure 5 showing the connection between the drive shaft and the driven shaft in a condition of rest or a condition in which there is no fluid pressure, Figure 7 is a view partially in cross-section similar to Figure 6, and showing the helical cam on the drive shaft, and Figure 8 is a view partially in cross-section similar to Figure 6 but showing the drive shaft and the driven shaft in a condition of operation in which the fluid pressure has disconnected the rigid connection between the drive shaft and the driven shaft.

Referring in greater detail to the drawings in which like numerals indicate like parts throughout the several views, the present invention consists in a power-steering apparatus for a vehicle and comprises a housing 10 mounted upon the lower end of the steering drive shaft housing 11 adjacent to one side of the automobile engine 12.

A fluid pump 13 mounted upon the side of the engine 12 is driven by the same belt 14 which drives the generator 15 and the fan 16 of the engine. A reservoir for fluid is secured to the side of the engine 12 and is indicated in Figures 1 and 2 by the reference numeral 17.

A pitman arm 18 extends below the housing 10 and is connected to the drive link 19 of the automobile steerable wheel assembly.

Within the housing 10, a segment gear 20 which carries the pitman arm 18 is in mesh with a worm gear 21 on the exterior of a hollow driven shaft 22 extending within the housing 10 and having one end supported in a bearing 23 in the lower end of the housing and an intermediate portion supported in another bearing 24 in a partition 25 intermediate the ends of the housing.

A drive shaft 26 extends within the steering drive shaft housing 11 in end to end relation with respect to the driven shaft 22 and has an end portion within the housing provided with a bore 27 extending inwardly from the end adjacent to the driven shaft 22 to a point spaced from that end. The inner wall of the driven shaft 22 adjacent to the drive shaft 26 is provided with grooves indicated by the reference numeral 28 and the bore 27 is provided with similar grooves 29 normally in registry with grooves 28. A piston 30 is mounted within the driven shaft 22 for sliding movement therein and has one end projecting into the bore 27.

Splines 31 are cut on the end portion of the piston 30 and in a position at rest or when no fluid pressure is within the driven shaft 22, the splines 31 engage both the grooves 28 in the driven shaft and the grooves 29 in the bore of the drive shaft 26.

The end of the housing 10 remote from the shaft housing 11 is provided with a cap plate 32 in which is threadedly received one end of a flexible hydraulic coupling 33 connecting the interior of the driven shaft 22 with the fluid pump 13.

A spring 34 positioned within the bore 27 has one end resting upon the inner end of the bore and the other end bearing against the free end of the piston 30 and biases the piston to a position in which its splines engage not only the grooves 29 in the bore in the drive shaft 26 but also the grooves 28 in the inner wall of the end portion of the driven shaft 22.

The outer surface of the driven shaft 22 at its end remote from the worm gear 21 is provided with other splines indicated by the reference numeral 35 for securing a rotor 36 thereon, the rotor 36 by reason of the splines 35 being permitted to slide longitudinally upon that portion of the driven shaft 22 and also permitting the rotor 36 to drive the driven shaft 22 when rotated.

The periphery of the rotor 36 is provided with outwardly extending flanges 37 and 38 one on each side of the rotor, the area between the flanges being channeled and provided with spaced blades 39.

A pair of inlets 40 and 41 extend through the wall of the housing 10 and are spaced longitudinally from each other with respect to the housing and on opposite sides of the housing. A flange collar 42 surrounds the end portion of the drive shaft 26 on which is provided a helical cam 43, the collar 42 being provided with a complemental cam groove 44 in which the cam 43 rides. The flanges 45 of the collar 42 are bolted to one side of the rotor 36 by means of bolts 46 which traverse slots 47 formed in the flanges 45 and provide a means for adjusting the flanges of the collar relative to the body of the rotor 36.

An outlet for the hydraulic fluid is provided on the opposite side of the housing 10 from the inlets 40 and 41 as indicated by the reference numeral 48.

Each of the blades 39 on the periphery of the rotor 36 is provided with a bleed hole 49 so that when the vehicle is traveling in a straight line and no turning movement is applied to the drive shaft 26, the rotor 36 will be positioned between each of the inlets 40 and 41 and fluid flowing therefrom will flow into the spaces between the blades on each side of the rotor with equal pressure and will travel through the bleed holes 49 to the outlet 48 without imparting rotational movement to the rotor 36.

When the drive shaft 26 is rotated in either direction the cam 43 traveling in the cam groove 44 will cause the collar 42 to pull the rotor 36 from its neutral position to a position at which fluid from one or the other of the inlets 40 and 41 will flow into the spaces between the blades 29 of the rotor causing the rotor to rotate driving the worm gear 21 with it and imparting movement to the segment gear 20 and causing the pitman arm 18 to turn the wheels of the vehicle.

Due to the tendencies of the wheels of the vehicle to resume their straight line position, resistance will be offered to the rotation of the rotor 36 and the collar will be urged to move relative to the drive shaft 26. Upon return of the drive shaft 26 to its normal straight line position, the collar 42 will shift the rotor 36 to its neutral position returning the wheels of the vehicle to their straight line position.

Relief valve 50 in the conduit 51 controls the pressure of the fluid in the main conduit 52 and in the conduit 53 which connects the inlets 40 and 41 to the fluid pump 13. The conduit 51 carries the excess fluid back to the reservoir 17, and another conduit 54 connects the outlet 48 with the reservoir 17 permitting the recirculation of fluid through the fluid motor formed by the rotor 36 to the fluid pump 13 driven by the engine 12. Another conduit 55 connects the bottom of the reservoir 17 with the fluid pump 13.

In Figure 6 it will be seen that the splined end portion of the piston 32 is partially within the bore 27 and the splines thereon engageable with the grooves in the bore and in the end of the driven shaft 22, connecting the drive shaft 26 directly with the driven shaft 22. In Figure 8, pressure of the fluid on the end of the piston within the driven shaft 22 has caused the splined end portion of the piston to move wholly within the bore 27 in the drive shaft so that the splines 28 engage only the grooves 29 formed in the inner wall of the bore 27 in the drive shaft 26, permitting the rotor to be the only driving connection between the steering apparatus of the automobile and providing full power steering.

Upon any failure of the fluid pressure, the piston will return to the position shown in Figure 6 permitting manual operation of the steering apparatus of the automobile.

What is claimed is:

1. In a hydraulic vehicle power-steering apparatus, a housing, a hollow driven shaft positioned within said housing, means drivingly connecting said driven shaft to a steerable wheel assembly, a drive shaft rotatably supported in said housing and having one end abutting the other end of said driven shaft, said drive shaft having a bore extending inwardly from said one end and terminating at a point spaced from said one end, a piston positioned within said driven shaft and slidable in said driven shaft and the bore of said drive shaft, means on said piston interengageable with means on said driven shaft and said drive shaft for drivingly connecting said piston to said drive and driven shafts, spring means positioned in the bore of said drive shaft and operatively connected to the latter for biasing the means on said piston into interengagement with the means on said driven shaft, and hydraulic means for effecting the slidable movement of said piston into the bore of said drive shaft to thereby cause interengagement of the means on said piston solely with the means on said drive shaft.

2. In a hydraulic vehicle power-steering apparatus, a housing, a hollow driven shaft positioned within said housing, a worm gear on said shaft adjacent one end thereof, a segment gear in meshing engagement with said worm gear, means operatively connecting said segment gear to a steerable wheel assembly, a drive shaft rotatably supported in said housing and having one end abutting the other end of said driven shaft, said drive shaft having a bore extending inwardly from said one end and terminating at a point spaced from said one end, a piston positioned within said driven shaft and slidable in said driven shaft and the bore of said drive shaft, means on said piston interengageable with means on said driven shaft and said drive shaft for driving the connecting said piston to said drive and driven shafts, a spring positioned within the bore of said drive shaft and operatively connected to the latter for biasing the means on said piston into interengagement with the means on said driven shaft, a fluid pump, conduit means connecting said pump with the interior of said driven shaft for effecting the sliding movement of said piston into the bore in said drive shaft to thereby cause interengagement of the means on said piston solely within the means on said drive shaft, and means for driving said fluid pump.

3. In a hydraulic vehicle power-steering apparatus, a housing, a hollow driven shaft positioned within said housing, a worm gear on said shaft adjacent one end thereof, a segment gear in meshing engagement with said worm gear, means operatively connecting said segment gear to a steerable wheel assembly, a drive shaft rotatably supported in said housing for steering movements and having one end abutting the other end of said driven shaft, said drive shaft having a bore extending inwardly from said one end and terminating at a point spaced from said one end, a piston positioned within said driven shaft and slidable in said driven shaft, and the bore of said drive shaft, means on said piston interengageable with means on said driven shaft and said drive shaft for drivingly connecting said piston to said driven and drive shafts, spring means positioned within the bore of said drive shaft to thereby cause interengagement of the means of said piston solely with the means on said driven shaft, a fluid pump, conduit means connecting said pump with the interior of said driven shaft for effecting the sliding movement of said piston into the bore in said drive shaft to thereby cause interengagement of the means on said piston solely with the means on said drive shaft, means for driving said fluid pump, a fluid motor within said housing drivingly connected to said driven shaft, said fluid motor being connected to said fluid pump, and control means carried on said driven shaft for effecting the actuation of said fluid motor upon execution of steering movement of said drive shaft.

No references cited.